United States Patent [19]

Tacklind et al.

[11] Patent Number: 5,282,100
[45] Date of Patent: Jan. 25, 1994

[54] DISK DRIVE WITH REDUCED ACOUSTIC NOISE

[75] Inventors: Thomas A. Tacklind, San Martin; Timothy Boyle, Santa Clara; Robert A. Caldeira, Santa Cruz, all of Calif.

[73] Assignee: Quantum Corporation, Milpitas, Calif.

[21] Appl. No.: 824,031

[22] Filed: Jan. 22, 1992

[51] Int. Cl.⁵ .......................................... G11B 33/08
[52] U.S. Cl. .............................. 360/97.02; 369/263
[58] Field of Search ................... 369/263, 80, 247; 360/104, 106, 107, 97.02; 181/201

[56] References Cited

U.S. PATENT DOCUMENTS

| | | | |
|---|---|---|---|
| 4,285,016 | 8/1981 | Gilovich | 360/107 |
| 4,922,478 | 5/1990 | Verhagen | 369/247 |
| 5,027,242 | 6/1991 | Nishida et al. | 360/107 |
| 5,034,837 | 7/1991 | Schmitz | 360/106 |
| 5,041,934 | 8/1991 | Stefansky | 360/106 |

FOREIGN PATENT DOCUMENTS 0098008 1/1984 European Pat. Off. ............ 369/263

Primary Examiner—Stuart S. Levy
Assistant Examiner—Kevin M. Watkins
Attorney, Agent, or Firm—David B. Harrison

[57] ABSTRACT

A miniature fixed disk drive data storage and retrieval subsystem manifesting reduced acoustical noise during data storage and retrieval operations includes a flat, generally rectangular box-shaped base defining a substantially continuous bottom wall and a continuous peripheral sidewall ending in a continuous peripheral lip region. The base defines an interior chamber in which a mass balanced rotary actuator head positioner structure and an in-hub spindle motor assembly are positioned for rotating at least one data storage disk. A mechanical reinforcement structure is secured between an upper region of the rotary actuator structure and the base, and between an upper region of the spindle motor assembly and the base. A cover encloses the interior chamber and is secured at the continuous peripheral lip region by a mechanical isolation and sound dampening. The cover is also mechanically isolated from the mechanical reinforcement structure by a continuous airspace therebetween. With this arrangement acoustic noise otherwise emanating away from the cover is attenuated.

6 Claims, 3 Drawing Sheets

DISK DRIVE WITH REDUCED ACOUSTIC NOISE

FIELD OF THE INVENTION

The present invention relates to rotating disk data storage systems. More particularly, the present invention relates to a fixed disk drive characterized by reduced acoustic noise.

BACKGROUND OF THE INVENTION

A conventional design for a head and disk assembly of a fixed disk drive calls for a bowl-shaped base casting with integral floor wall and four sidewalls extending upwardly at the periphery thereof, and a separate, flat top cover for enclosing an interior space defined by the base casting. One or more data storage disks are typically mounted in the interior space upon a spindle assembly most commonly including an internal brushless DC spindle motor. Data transducer heads for writing data onto data storage surfaces of the disks, and for reading back data from the disks are gang-mounted to a mass balanced rotary voice coil actuator assembly. Driving currents applied to an actuator coil cause the actuator assembly to rotate and thereby position the heads at "cylinder locations" which comprise concentric data storage track locations at each data storage surface.

It has been conventional design practice to attach a center shaft of the spindle motor and a center shaft of the rotary actuator to both the floor wall of the base casting and to the top cover. Dual attachments of these shafts or structures at the top and bottom rigidized the resultant structures and thereby improved their mechanical performance characteristics. Unfortunately, this desirable mechanical arrangement resulted in amplification of acoustic noise generated by the spindle motor and rotary actuator.

Acoustic noise generated in disk drive spindles may be attributable to spindle rotational speed. It may also be attributable to step function driving signals applied to operate a direct drive, brushless DC spindle motor. At the switching points of the step function driving signals, the torque produced in adjacent phase windings is equal, so there is no discontinuity in total torque produced by the spindle motor. However, the point of application of the torque force moves in location from phase winding to phase winding in the motor stator. At each commutation point, one phase sees a positive step of force and another sees a negative step of force. These abrupt forcing functions at the commutation point cause mechanical deformation and result in acoustic noise. Similar noise-producing phenomena occurs within the voice coil rotary actuator structure.

Contemporary disk drives are being designed with higher spindle speeds and faster access times. Both of these improvements, while enhancing storage capacities and reducing data access times, have resulted in increased acoustic noise.

It is well understood that one of the main noise emitters in a head and disk assembly is the "drum-like" top cover and bottom wall which are both excited by the spindle motor and the rotary actuator. Acoustic noise measurements have shown that most acoustic noise products generated in fixed disk drives emanate from the top cover and bottom wall. A very small component of the overall noise level emanates in directions leading away from the sidewalls.

One prior attempt to reduce acoustic noise within a head and disk assembly called for decoupling the spindle and actuator mechanism from its enclosure by employing a plurality of rubber isolator mounts. While that approach reduced unwanted acoustic noise, the rubber isolator mounts created a low frequency mode of the head and disk assembly, resulting in degraded vibration performance.

The creation of a separate outer package for a disk drive in order to isolate an inner drive assembly presents serious issues related to the desired to maintain existing disk drive length, width and height dimensions, collectively known as "form factor". The need has been particularly acute to maintain a low height profile or dimension.

Thus, a hitherto unsolved need has existed for a fixed disk drive having reduced acoustic noise without degraded performance characteristics and without enlarging the form factor of the drive.

SUMMARY OF THE INVENTION

A general object of the present invention is to provide a fixed disk drive module having reduced acoustic noise characteristics in a manner overcoming limitations and drawbacks of the prior art.

Another object of the present invention is to provide a generally flat, box-shaped fixed disk drive module with exterior major surfaces which are acoustically decoupled from acoustic noise generating components, thereby reducing amplification of acoustic noise components generated within the module.

A further object of the present invention is to isolate acoustically the two exterior major surfaces of a generally flat, box-shaped fixed disk drive assembly in a manner which does not increase substantially the overall height dimension of the drive, and further in a manner which does not reduce the stiffness of the resultant composite structural arrangement of the assembly.

In accordance with the principles of the present invention, a miniature fixed disk drive data storage and retrieval subsystem manifesting reduced acoustical noise during data storage and retrieval operations includes a flat, generally rectangular box-shaped base defining a substantially continuous bottom wall and a continuous peripheral sidewall ending in a continuous peripheral lip region. The base defines an interior chamber in which a mass balanced rotary actuator head positioner structure and an in-hub spindle motor assembly are positioned for rotating at least one data storage disk. A mechanical reinforcement structure is secured between an upper region of the rotary actuator structure and the base, and between an upper region of the spindle motor assembly and the base. A cover encloses the interior chamber and is secured at the continuous peripheral lip region by a mechanical isolation and sound dampening material. The cover is also mechanically isolated from the mechanical reinforcement structure by a continuous airspace therebetween. With this arrangement acoustic noise otherwise emanating away from the cover is attenuated by the continuous airspace thus defined and by the mechanical isolation and sound dampening material.

In one aspect of the invention, the mechanical reinforcement structure comprises a substantially continuous inner cover, and the cover comprises an outer cover secured along an outer peripheral edge portion of the inner cover by a mechanical isolation and sound dampening material.

In a related aspect of the invention the inner cover defines generally annular raised plateau regions at the vicinity of the rotary actuator structure and at the in-hub spindle motor assembly, and the outer cover defines generally annular openings aligned with the raised plateau regions and slightly oversized thereto so that the outer cover does not touch the inner cover at the raised plateau regions.

In a further related aspect the outer cover fits within a recess defined by the inner cover such that an upper surface of the outer cover is substantially coplanar with outer surfaces of the annular raised plateau regions such that the overall height dimension of the subsystem is not increased by the outer cover beyond the height dimension of the raised plateau regions of the inner cover.

In another aspect of the present invention, a printed circuit board is mounted to the base exteriorly adjacent to the continuous bottom wall, and a sealing medium is provided for sealing the printed circuit board means to the base thereby to define a sealed interior space between the continuous bottom wall and the printed circuit board.

In a related aspect, the continuous bottom wall defines generally annular raised plateau regions at the vicinity of the rotary actuator structure and at the in-hub spindle motor assembly, and the printed circuit board defines generally annular openings aligned with the annular raised plateau regions. In this aspect of the invention, the sealing medium includes portions for sealing the printed circuit board to the continuous bottom wall at the vicinity of the annular openings.

These and other objects, aspects, advantages and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

Figure 1:
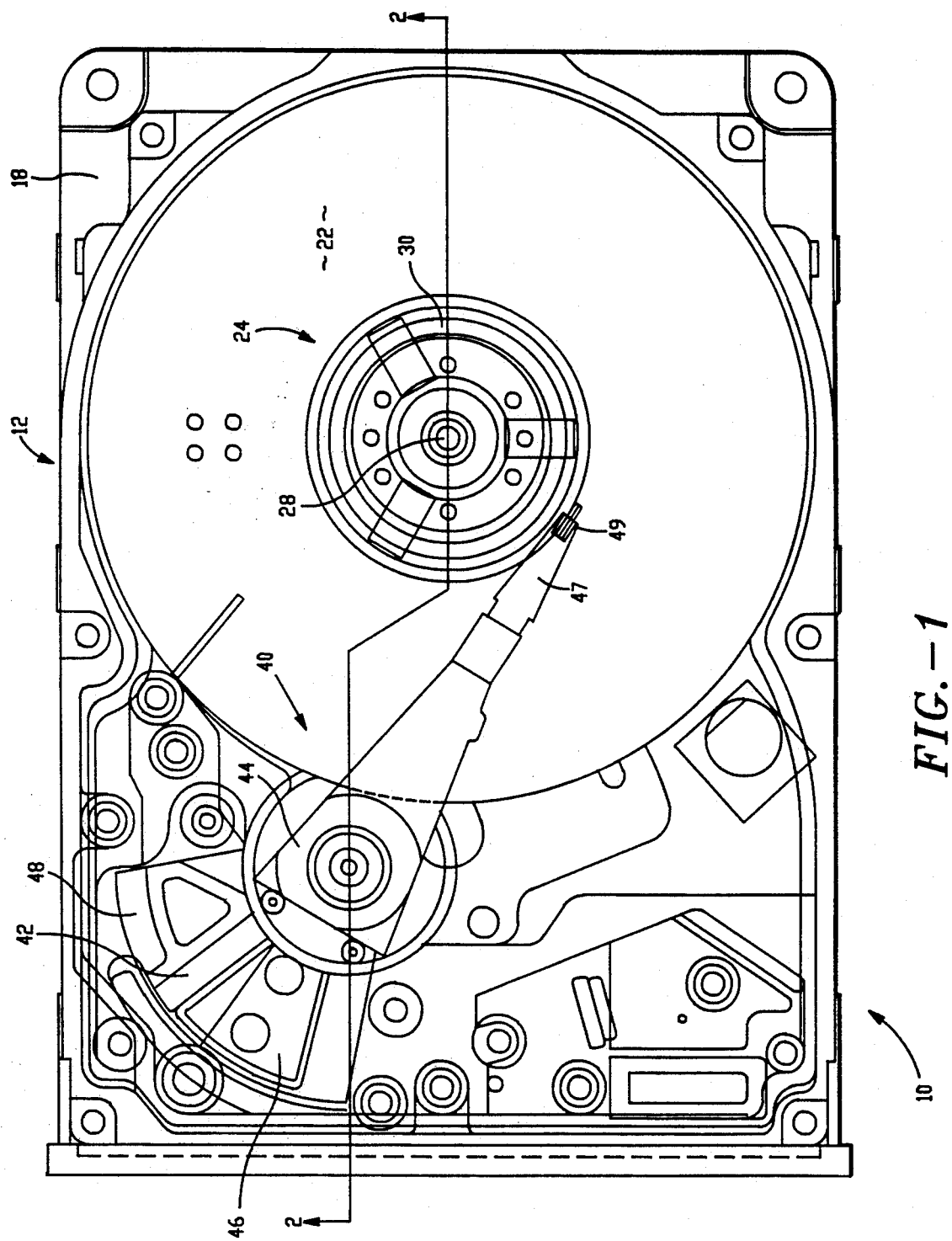
FIG. 1 is a substantially enlarged and diagrammatic top plan view of a micro-Winchester disk drive head and disk assembly.
Figure 2:
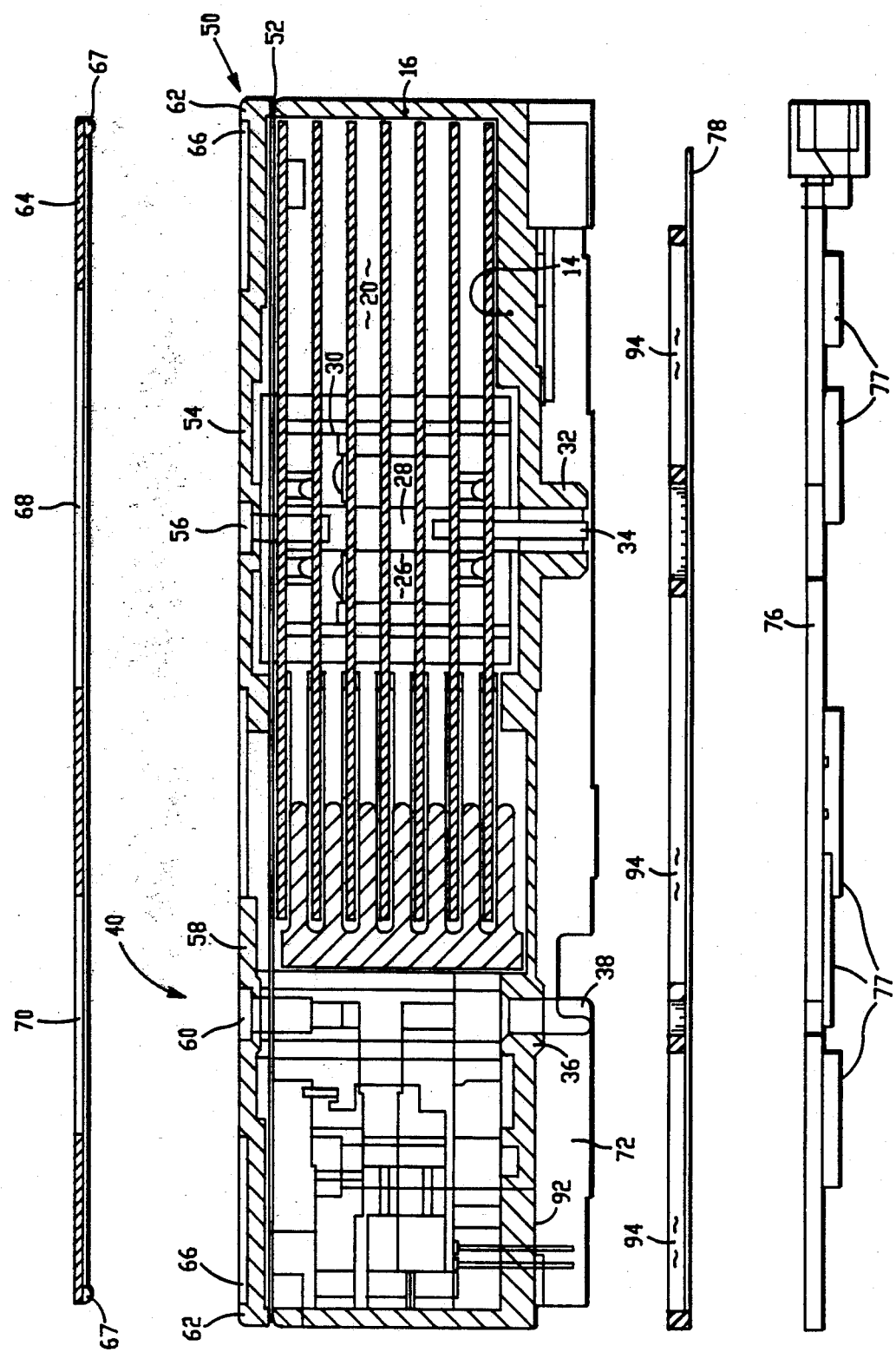
FIG. 2 is an exploded side view in section taken along line 2—2 of FIG. 1 of a micro-Winchester disk drive module in accordance with principles of the present invention.
Figure 3:
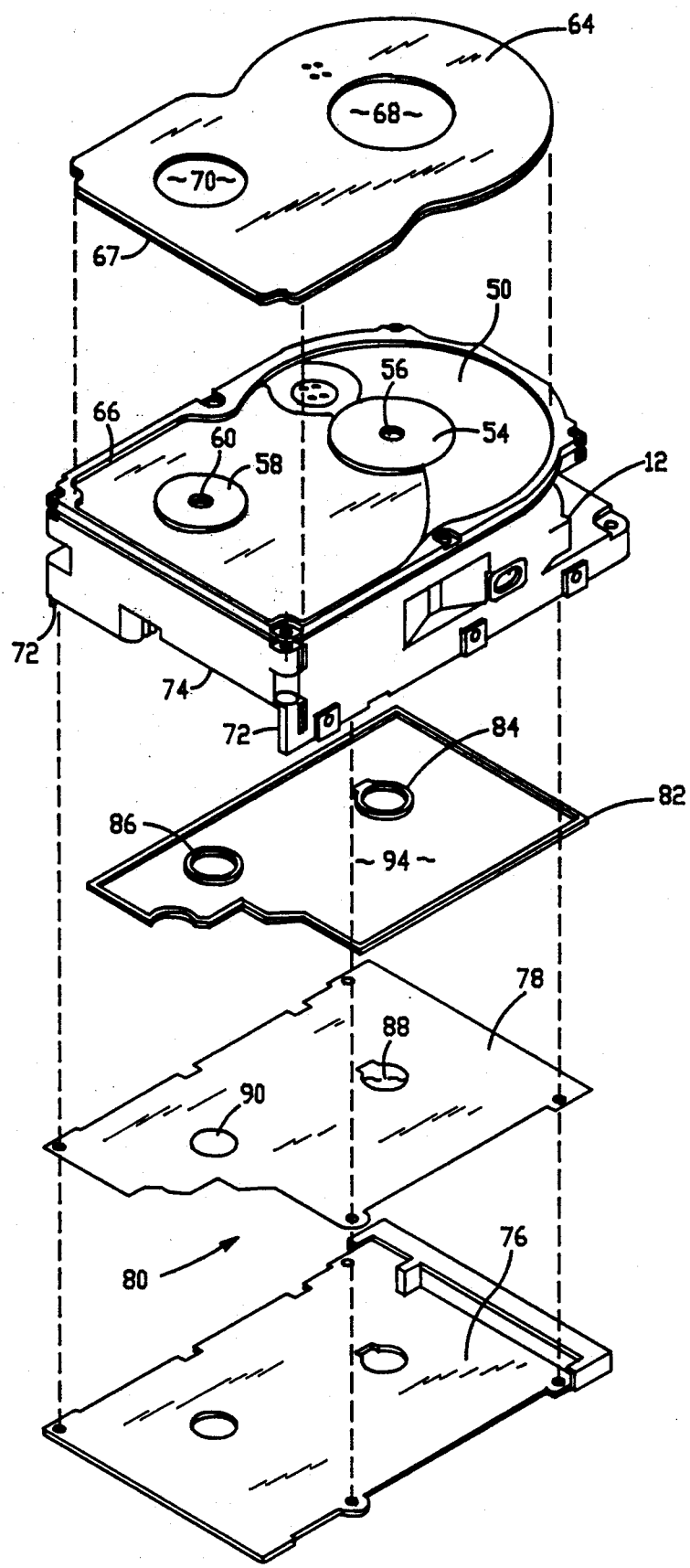
FIG. 3 is an exploded isometric view of the FIG. 2 disk drive module illustrating aspects of the present invention.

With reference to FIGS. 1-3, an exemplary micro-Winchester disk drive module 10 includes a base casting 12 having a substantially continuous floor wall 14, and a continuous peripheral sidewall 16 extending upwardly from the floor wall 14 to an upper peripheral lip 18. The base casting 12 thereby defines an interior space 20 below the peripheral lip 18. Therein, a plurality of data storage disks 22 are mounted coaxially upon a spindle 24. The rotating spindle 24 includes an in-hub DC brushless spindle motor 26. A stator of the motor 26, as well as bearings and seals are secured between a post 28 and a rotating hub 30 of the spindle 26. The post 28 is precision fit into an opening defined in an inverted plateau portion 32 of the floor wall 14 and then glued in place by a suitable adhesive material. Any other suitable securement methods may be employed, such as threaded nut, flange and screws or interference press fit. The post 28 is hollowed out at the plateau portion 32, and cables 34 from the spindle motor 26 pass through the hollowed out space. The spindle motor 26 is electronically commutated by three phase, substantially square wave driving signals so that it directly rotates the hub 30 and disks 22 at a constant angular velocity of e.g. 4500 revolutions per minute. This velocity is approximately 900 RPM faster than has heretofore been conventionally employed in micro-Winchester disk drives, and a faster data transfer rate, e.g. up to 10 megabits per second is achieved with the increased angular velocity. Unfortunately, the higher velocity sources more acoustic noise.

Also secured in an opening defined in another inverted plateau region 36 is an actuator journal post 38 and cartridge bearing assembly to which a mass balanced rotary voice coil actuator structure 40 is rotatably attached. A flat, wedge shaped coil 42 of a rotary actuator 44 of the structure 40 is disposed between two sets of permanent magnets 46 and 48. Load beams 47 are secured at one end region thereof to integral, "E-block" arm extension portions of the rotary actuator 44. Data transducer heads 49 are gimbal-mounted and supported at the distal ends of the load beams 47.

Driving current passing through the coil 42 in one flow direction causes the actuator 44 to rotate clockwise, whereas reverse current flow causes counterclockwise rotational driving forces to be imparted to the actuator 44. These driving currents have very sharp edges, so that significant driving forces are imparted to the actuator 44, and it accelerates and decelerates in milliseconds. Actuator movements are thus characterized by "popping" or "ticking" sounds, depending upon the sharpness of the waveforms driving the actuator coil 42. In the disk drive module 10, each disk 22 defines two data storage surfaces. Each data storage surface includes e.g. 2097 concentric data tracks, arranged at a track density of 2284 tracks per inch. In this arrangement an average track access time of ten milliseconds is a typical performance objective. Fast access times tend to generate increased acoustical noise at the rotary actuator structure 40.

The opening of the base casting 12 is closed by a cast aluminum alloy inner cover 50 which is dimensioned to fit over the peripheral lip 18 of the base casting 12. A seal 52 is disposed between the lip 18 and an oppositely facing peripheral edge region of the cover 50 to achieve an air tight sealing arrangement as is conventional. The cover 50 defines a raised plateau region 54 at the spindle assembly 24. A screw 56 secures the raised plateau region 54 of the cover 50 to the spindle post 28.

A second raised plateau region 58 of the cover 50 is located at the rotary actuator structure 40. A screw 60 secures the raised plateau region 58 of the cover to the post 38 of the rotary actuator structure 40.

While the inner cover 50 is rendered structurally more rigid by virtue of the raised plateau regions 54 and 58, and by a thickened peripheral wall region 62, the inner cover 50 acts as a sound amplifying and emitting surface, similar to a drumhead, and emits acoustic noise from the spindle motor 26 and also from the rotary actuator structure 40.

In accordance with principles of the present invention, an outer cover 64 is provided. As best seen in FIG. 3, the outer cover is dimensioned to fit in nesting relationship within the external dimensions of the inner cover 50 upon an inner peripheral lip 66 thereof. A suitable mechanical isolation and sound dampening material 67 such as adhesive coated foam rubber (e.g. 3M 7979 material) secures the periphery of the outer cover 64 to the peripheral lip 66, thereby isolating the outer cover mechanically and acoustically from the inner cover 50.

The outer cover 64 defines two circular openings 68 and 70, as shown in FIGS. 2 and 3. The opening 68 is sized to be slightly larger than the raised spindle plateau region 54 so that the outer cover 64 fits around, but does not touch, the raised plateau region 54. Similarly, the opening 70 is sized to be slightly larger than the raised actuator plateau region 58 so as not to come into contact with it. When the outer cover 64 is installed onto the inner cover 50, a considerable attenuation of acoustic noise is achieved. Also, with this nesting arrangement between the outer and inner covers 64 and 50, there is no resultant increase in an overall height dimension of the disk drive module 10, which is a commercial requirement of contemporary disk drive modules. The raised plateaus 54 and 58 become substantially coplanar with a top surface of the outer cover 64, and there is no resultant increase of the overall height dimension for either the spindle assembly 24 or for the rotary actuator structure 40.

For example, without the outer cover, acoustic noise emanated in a direction from the exposed inner cover 50 has been measured at 45 dBA. When the outer cover 64 is installed and the same measurements are made, the acoustic noise level has been reduced to 38 dBA, for example.

Two oppositely facing, longitudinal side skirt regions 72 extend downwardly from the sidewalls 16 at the long sides of the base casting 12. A shallow well 74 at one corner of the base 12 is sized to receive a read channel printed circuit board assembly (not shown). A main printed circuit board 76 fits over the read channel printed circuit board assembly and shallow well 74. The main printed circuit board 76 secures and interconnects a plurality of integrated circuits 77 generally as shown in FIG. 2. A printed circuit board insulator 78, formed of a suitable thin plastic film material, is dimensioned generally to conform to the dimensions of the main printed circuit board 76, and after assembly is disposed between the upper surface of the circuit board 76 and an oppositely facing bottom surface region 92 of the base casting 12. A cutout region 80 defined by the insulator 78 is provided at the vicinity of the shallow well 74 of the base.

There are three flexible foam gaskets 82, 84 and 86 die-cut from a sheet of adhesive-backed foam insulator material (not shown). A main gasket 82 is generally dimensioned to follow the periphery of the insulator 78. A motor gasket 84 is designed to fit around an opening 88 defined in the insulator 78 which is sized and and aligned to fit around the downwardly extending motor spindle inverted plateau portion 32 of the base. In similar fashion an actuator gasket 86 is designed to fit around an opening 90 defined in the insulator 78 which is sized and aligned to fit around the downwardly extending actuator inverted plateau region 36. Since the gaskets 82, 84 and 86 are cut from the same sheet of insulating foam material, they have the same thickness dimension. The adhesive-coated gaskets 82, 84 and 86 are secured to the printed circuit board insulator 78. When the insulator-gasket composite arrangement is assembled and positioned as shown in FIG. 2, and when the printed circuit board 76 is in position, the gaskets 82, 84 and 86 seal against oppositely facing regions of an undersurface 92 of the base 12 and define a thin, planar, enclosed airspace between the undersurface 92 of the base 12 and the oppositely facing major portion of the insulator 78 (which is stabilized and reinforced by the printed circuit board 76. This thin continuous airspace is generally designated by the reference numeral 94 in FIGS. 2 and 3.

Acoustic measurements have determined that the audible sound level emanating away from the undersurface 92 of the base during disk drive operation is about 42 dBA. When the enclose airspace 94 is provided, for example with the gaskets 82, 84 and 86 in combination with the insulator film 78, the audible noise emanating from the same direction is reduced to 39 dBA.

While the inner cover 50 is illustrated as a continuous closure member, the inner cover 50 may define an open beam reinforcement structure for securing and reinforcing the top of the spindle structure 26 and the rotary actuator structure 40. In this alternative embodiment, the outer cover 64 encloses and seals the interior space, and is not structurally coupled to the inner reinforcement structure, except at the periphery of the base 12, for example.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A miniature fixed disk drive subsystem connectable to a host computing system and manifesting reduced acoustical noise during operation comprising:

a flat, generally rectangular box-shaped base defining a substantially continuous bottom wall and a continuous peripheral sidewall, the base thereby defining an interior chamber in which a head positioner actuator structure and a spindle for rotating a fixed data storage disk stack are disposed, inner cover means secured at a peripheral lip of the base and further secured to the actuator structure and to the spindle, the inner cover means defining generally annular raised plateau regions at the vicinity of the rotary actuator structure and at the in-hub spindle motor assembly.

outer cover means secured to the inner cover means along a peripheral edge thereof but not to either one of the actuator structure and spindle, the outer cover means defining generally annular openings aligned with the raised plateau regions and slightly oversized thereto, thereby defining a thin, flat and continuous airspace between the inner cover means and the outer cover means without the outer cover means touching the inner cover means at the raised plateau regions.

whereby acoustic noise otherwise emanating away from the inner cover means is attenuated by the thin, flat continuous airspace between the inner cover means and the outer cover means.

2. The subsystem set forth in claim 1 wherein the outer cover means fits within a recess defined by the inner cover means such that an upper surface of the outer cover means is substantially coplanar with outer surfaces of the annular raised plateau regions such that the overall height dimension of the subsystem is not increased by the outer cover means beyond the height dimension of the raised plateau regions of the inner cover means.

3. The subsystem set forth in claim 1 wherein the outer cover means is secured to the inner cover means along the peripheral edge thereof by a mechanical isolation and sound dampening material.

4. The subsystem set forth in claim 1 further comprising printed circuit board means mounted to the base exteriorly adjacent to the continuous bottom wall and sealing means for sealing the printed circuit board means to the base thereby to define a sealed interior airspace between the continuous bottom wall and the printed circuit board means.

5. The subsystem set forth in claim 4 wherein the continuous bottom wall defines generally annular raised plateau regions at the vicinity of the rotary actuator structure and at the in-hub spindle motor assembly, and wherein the printed circuit board means defines generally annular openings aligned with the annular raised plateau regions, and wherein the sealing means includes means for sealing the printed circuit board means to the continuous bottom wall at the vicinity of the annular openings.

6. The subsystem set forth in claim 4 wherein the sealing means comprises a gasket carrying adhesive on opposite faces thereof.

* * * * *